United States Patent
Lin et al.

(10) Patent No.: US 10,850,348 B2
(45) Date of Patent: Dec. 1, 2020

(54) DEVICE AND METHOD FOR ALIGNMENT OF PARTS FOR LASER WELDING

(71) Applicant: Dana Canada Corporation, Oakville (CA)

(72) Inventors: Shuding Lin, Oakville (CA); Mike St. Pierre, Oakville (CA)

(73) Assignee: DANA CANADA CORPORATION, Oakville (CA)

( * ) Notice: Subject to any disclaimer, the term of this patent is extended or adjusted under 35 U.S.C. 154(b) by 228 days.

(21) Appl. No.: 16/047,572

(22) Filed: Jul. 27, 2018

(65) Prior Publication Data

US 2019/0030642 A1    Jan. 31, 2019

Related U.S. Application Data

(60) Provisional application No. 62/538,296, filed on Jul. 28, 2017.

(51) Int. Cl.
*B23K 26/00*    (2014.01)
*B23K 26/035*    (2014.01)
*B23K 37/04*    (2006.01)

(52) U.S. Cl.
CPC ............ *B23K 26/037* (2015.10); *B23K 37/04* (2013.01); *F28F 2275/067* (2013.01)

(58) Field of Classification Search
CPC .............. B23K 26/0006; B23K 26/037; B23K 26/0661; B23K 26/0846; B23K 26/0853;
(Continued)

(56) References Cited

U.S. PATENT DOCUMENTS

| 4,710,608 A | * | 12/1987 | Noda | ................. | B23K 37/0426 |
| | | | | | 219/125.1 |
| 4,879,448 A | * | 11/1989 | Folger | ................ | B23K 26/0846 |
| | | | | | 219/121.63 |

(Continued)

FOREIGN PATENT DOCUMENTS

| CN | 101890576 | 11/2010 |
| CN | 201960269 | 9/2011 |

(Continued)

OTHER PUBLICATIONS

Canadian Intellectual Property Office, International Search Report and Written Opinion Issued in Application PCT/CA2018/050915, dated Oct. 4, 2018, 14 pages, Canadian Patent Office, Gatineau Quebec.

(Continued)

*Primary Examiner* — Hung D Nguyen
(74) *Attorney, Agent, or Firm* — McCoy Russell LLP

(57) ABSTRACT

A device and method for alignment of parts for welding, having a bottom welding fixture and a top welding fixture. The bottom welding fixture has a plurality of fixed locating pins for positioning of parts to be welded and limiting movement of the parts in a first axis and a perpendicular second axis. At least pair of alignment block assemblies to actuate movement of the parts to be welded in the first and second axes. The alignment block assembly having an alignment block moveable from a first position to a second position for contacting and aligning the parts. An actuator coupled to the top welding or bottom welding fixture to actuate movement of the alignment block from the first position to the second position upon engagement of the top welding fixture to the bottom welding fixture.

15 Claims, 10 Drawing Sheets

(58) Field of Classification Search
CPC .... B23K 26/0884; B23K 26/10; B23K 26/21;
B23K 26/211; B23K 26/22; B23K
26/352; B23K 26/355; B23K 26/361;
B23K 26/382; B23K 26/40; B23K
26/702; B23K 37/04; B23K 37/0408;
B23K 37/0426; B23K 37/0435; B23K
37/0443; B23K 37/0452; B23K 37/0461;
B23K 37/0533; B23K 2101/36; B23K
2101/38; B23K 2101/40; F28F 2275/067
USPC .............. 219/121.6, 121.63, 121.82, 124.21,
219/124.22, 124.31, 124.4, 124.5, 125.1,
219/125.11, 126, 121.64

See application file for complete search history.

(56) References Cited

U.S. PATENT DOCUMENTS

| | | | |
|---|---|---|---|
| 5,045,668 A | 9/1991 | Neiheisel | |
| 5,175,410 A * | 12/1992 | Freedman | B23K 1/0056 |
| | | | 219/121.63 |
| 5,517,059 A * | 5/1996 | Eytcheson | B23K 26/702 |
| | | | 219/121.63 |
| 6,011,240 A | 1/2000 | Bishop | |
| 6,121,567 A * | 9/2000 | Guerrina | B23K 11/066 |
| | | | 219/125.11 |
| 6,269,870 B1 | 8/2001 | Banzhaf | |
| 6,474,074 B2 | 11/2002 | Ghoshal | |
| 6,479,168 B2 | 11/2002 | Mazumder | |
| 6,681,151 B1 | 1/2004 | Weinzimmer | |
| 6,942,018 B2 | 9/2005 | Goodson | |
| 7,137,442 B2 | 11/2006 | Kawahara | |
| 7,271,364 B1 * | 9/2007 | Bye | B23K 37/0435 |
| | | | 219/121.63 |
| 7,650,931 B2 | 1/2010 | Siu | |
| 8,038,048 B2 | 10/2011 | Nielsen | |
| 8,042,606 B2 | 10/2011 | Batty | |
| 8,113,415 B2 * | 2/2012 | Paquette | B23K 11/115 |
| | | | 219/125.1 |
| 8,746,536 B2 * | 6/2014 | Uecker | B23K 37/053 |
| | | | 228/44.5 |
| 8,857,699 B2 | 10/2014 | Sjodin | |
| 8,944,307 B2 | 2/2015 | Kawamura | |
| 9,018,560 B2 * | 4/2015 | Krizansky | B23K 11/14 |
| | | | 219/121.63 |
| 9,381,597 B2 | 7/2016 | Stermann | |
| 9,423,187 B2 | 8/2016 | Fan | |
| 9,610,675 B2 | 4/2017 | Southwell | |
| 9,939,204 B2 | 4/2018 | Phan | |
| 2005/0194362 A1 * | 9/2005 | Eisenhower, Jr. | |
| | | | B23K 37/0452 |
| | | | 219/121.63 |
| 2007/0015671 A1 | 1/2007 | Naumovski | |
| 2007/0241250 A1 * | 10/2007 | Wong | B23K 37/0435 |
| | | | 248/226.11 |
| 2009/0179013 A1 * | 7/2009 | Toeniskoetter | B23K 26/0884 |
| | | | 219/121.63 |
| 2010/0032141 A1 | 2/2010 | Heydari | |
| 2010/0157535 A1 | 6/2010 | Oniki | |
| 2010/0206768 A1 | 8/2010 | Hofmann | |
| 2011/0002109 A1 | 1/2011 | Hauschild | |
| 2011/0284511 A1 | 11/2011 | Boynton | |
| 2011/0303392 A1 | 12/2011 | Horiuchi | |
| 2013/0306274 A1 | 11/2013 | Yang | |
| 2013/0306275 A1 | 11/2013 | Yang | |
| 2015/0129177 A1 | 5/2015 | Pai | |
| 2015/0204617 A1 | 7/2015 | Thanhlong | |
| 2016/0010927 A1 | 1/2016 | Ahamed | |
| 2016/0018165 A1 | 1/2016 | Ahamed | |
| 2016/0018166 A1 | 1/2016 | Ahamed | |
| 2016/0091258 A1 | 3/2016 | Ahamed | |
| 2016/0270951 A1 | 9/2016 | Martins | |
| 2016/0282914 A1 | 9/2016 | Saito | |
| 2016/0290739 A1 | 10/2016 | Mochizuki | |
| 2016/0295739 A1 | 10/2016 | Ahamed | |
| 2017/0023306 A1 | 1/2017 | Stavi | |
| 2017/0055372 A1 | 2/2017 | Ahamed | |
| 2017/0076874 A1 | 3/2017 | O'Phelan | |

FOREIGN PATENT DOCUMENTS

| | | |
|---|---|---|
| CN | 202240143 | 5/2012 |
| JP | 3192932 | 9/2014 |
| JP | 5922826 | 12/2016 |
| JP | 2017003160 | 1/2017 |
| JP | 6216383 | 3/2017 |
| JP | 2017202710 | 11/2017 |
| KR | 100352789 | 7/2001 |
| WO | 2018116951 | 6/2018 |

OTHER PUBLICATIONS

Canadian Intellectual Property Office, International Search Report and written opinion issued in application PCT/CA2018/050917, dated Oct. 23, 2018, 9 pages, Canadian Patent Office, Gatineau Quebec.

English Machine Tranlsation of JP2017003160 (10 pages).

English Machine Translation of JP5922826 (12 pages).

English Machine Translation of JP6216383 (17 pages).

English Machine Translation of WO2018116951 (18 pages).

Patschger, Andreas et al., "New approach to clamping in microwelding" Journal of Laser Applications, vol. 27, Issue No. S2, pp. S29013-1 to S29013-8, Feb. 2015.

Patschger, Andreas, et al., "Process-limiting Factors and Characteristics of Laser-based Micro welding", Physics Procedia V. 56, pp. 740-749 1, Jan. 2014.

* cited by examiner

DEVICE AND METHOD FOR ALIGNMENT OF PARTS FOR LASER WELDING

CROSS REFERENCE TO RELATED APPLICATION

The application claims the benefit of and priority to U.S. Provisional Patent Application No. 62/538,296 filed Jul. 28, 2017, under the title DEVICE AND METHOD FOR ALIGNMENT OF PARTS FOR LASER WELDING. The content of the above patent application is hereby expressly incorporated by reference into the detailed description hereof.

FIELD

The present disclosure generally relates to a device used for alignment of parts, in particular, parts used to make ultra-thin heat transfer devices, prior to laser welding of the parts, and a method for alignment of parts.

BACKGROUND

The heat generated by computer chips in personal electronic devices must be dissipated to maintain high processing speeds and to avoid high temperatures which may cause damage to the device or discomfort to the user. Heat dissipation is of greater concern as chip sizes continue to decrease and operating speeds increase, resulting in increased power densities and greater heat generation per unit area.

Some personal electronic devices incorporate thin heat-spreading devices such as planar sheets of graphite and/or copper, and/or heat pipes mounted on planar sheets, to spread and dissipate the heat generated by the computer chip over the area of the device. It is believed that the effectiveness of these existing technologies may not be sufficient to deal with the increased power densities of future generations of computer chips.

Compact cooling devices are known in which the heat of the computer chip is transported away from the chip as latent heat of condensation. These devices are known as "vapor chambers", and have a flat, planar, panel-like structure with an internal chamber containing a working fluid. An area of the vapor chamber which is in contact with the computer chip comprises a liquid reservoir. Heat generated by the computer chip boils the working fluid in the liquid reservoir, and the gaseous working fluid generated by the boiling is circulated throughout the area of the vapor chamber through internal gas flow passages. The boiling of the working fluid in the reservoir cools the chip. As the gaseous working fluid flows away from the computer chip, its temperature drops and it condenses, releasing the heat of condensation in areas distal to the chip, thereby spreading the heat across the area of the vapor chamber. The condensed working fluid is then transported back to the reservoir to repeat the cycle. For example, the chamber may contain a hydrophilic wick material which causes capillary flow of the condensed working fluid back to the reservoir to repeat the cycle. An example of a vapor chamber is disclosed in Publication No. US 2016/0290739 A1 by Mochizuki et al.

Vapor chambers are commonly constructed from copper and the layers making up the part are joined together by diffusion bonding. Copper is pliable and expensive, making it difficult to produce parts which are sufficiently rigid while meeting industry thickness requirements. Also, diffusion bonding is a slow batch process, and each part can require several hours to produce. Thus, the use of diffusion bonding for mass production of vapor chambers is uneconomical.

There remains a need for improved vapor chambers which are sufficiently rigid, thin, durable and inexpensive to manufacture, as well as their manufacturing methods. Further, as these heat transfer devices are ultra-thin, proper alignment and welding of the parts that make up the ultra-thin heat transfer devices can be challenging, and there is a need for a device that can help with proper alignment of the parts of the ultra-thin heat transfer devices prior to welding to ensure that they are properly manufactured. Moreover, there is a need in the art for a method for proper alignment of the parts used for making the ultra-thin heat transfer device prior to welding.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The device and method used for alignment of parts for welding is described with reference to the figures.

Figure 1:
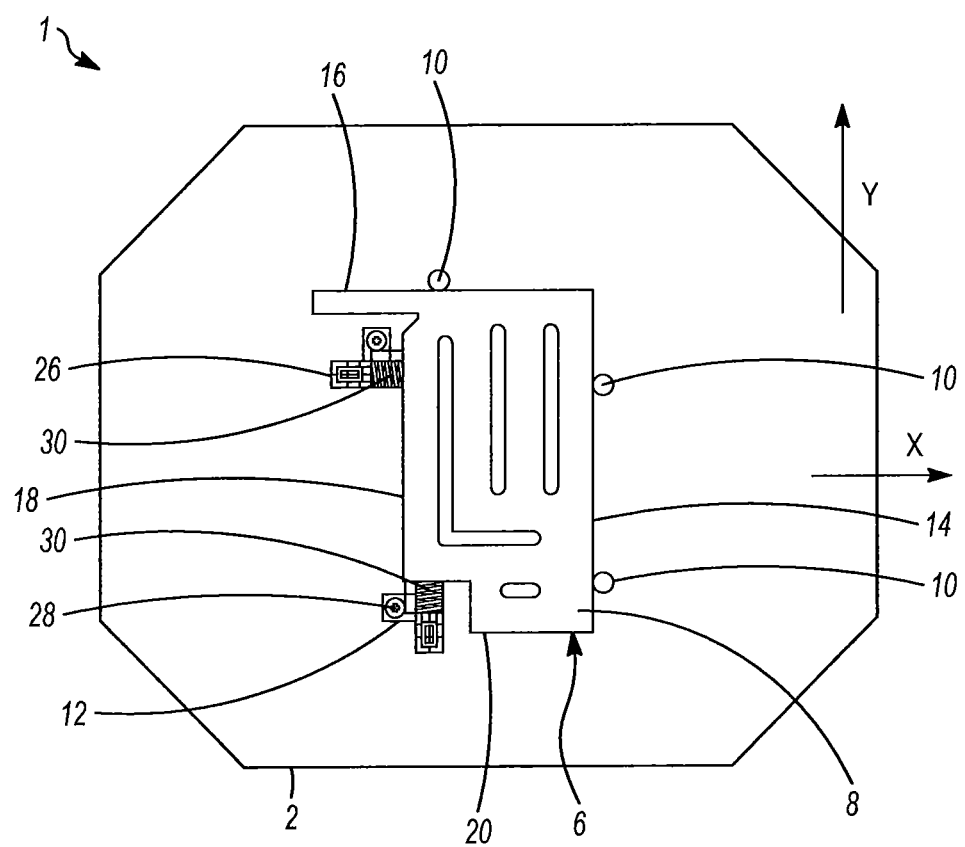
FIG. 1 shows a plan view of bottom fixture assembly of the welding device in accordance with a first embodiment of the disclosure.
Figure 5:
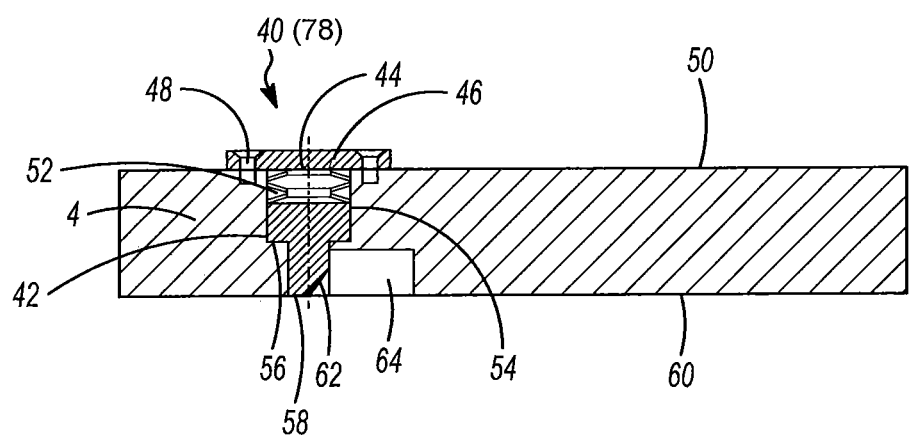
FIG. 5 shows a side cross-sectional view of the top fixture assembly of the welding device in accordance with a first embodiment of the disclosure.

FIG. 1 shows a plan view of a bottom welding fixture 2 of a device 1 used for alignment of a plate pair 8 prior to welding. The device 1 has a bottom welding fixture 2 and a top welding fixture 4 (FIG. 5). Although the shape of the bottom welding fixture 2 is generally octagonal, as should be recognized by a person of skill in the art, the shape of the fixture is not particularly limited, and can be varied depending upon design and application requirements. In the embodiment shown in FIG. 1, the bottom welding fixture 2 can be provided with a profile 6 outlining the position of the plates 8 to be welded. The profile 6 can be formed by etching out or marking an outline of the periphery of the plate 8 to be welded. Although, the profile 6 shown in FIG. 1 has a generally rectangular shaper, as should be recognized by a skilled worker, the shape of the profile 6 can be varied depending upon the design and application requirements. In addition, providing a profile on the bottom welding fixture 2 is not necessary nor required, so long as the bottom welding fixture 2 is provided with features, as described herein, for alignment of the plates 8. Hence, the bottom welding fixture 2 can be provided without the profile having the etching or marking shown in FIG. 1, with the profile being established by the presence of the pins 10 and alignment block assemblies 12 (described below).

The bottom welding fixture 2 is also provided with a set of fixed locating pins 10 and a set of alignment block assemblies 12. The structure of the fixed locating pins 10 is not particularly limited and can be varied depending upon design and application requirements. In the embodiment shown, the fixed locating pins 10 are cylindrical in shape projecting out of the plane of the paper. In addition, the fixed locating pins 10 are fixed in position on the bottom welding fixture 2, to help prevent movement of the plates 8. The number and position of the fixed locating pins 10 is not particularly limited and can be varied depending upon design and application requirements. In the embodiment shown in FIG. 1, three fixed locating pins 10 are provided on the bottom welding fixture 2, along the edge of the profile 6 of the plates 8. Two of the fixed locating pins 10 are positioned at a first edge 14 of the profile 6 of the plates 8 preventing movement of the plates 8 in a first axis (X); and a single locating pin 10 is positioned at a second edge 16 of the profile 6 of the plates 8 preventing movement of the plates 8 in a second axis (Y). As noted above, the pins 10 function as a stop to prevent movement of the plates 8 and assist with alignment of the plates 8. Hence, the number of pins 10 can be varied, and for instance, where 1, 2, 3, 4, 5 or 6 pins 10 are used on each side of the plates 8, depending upon design and application requirements.

In the embodiment shown in FIG. 1, the bottom welding fixture 2 is also provided with a pair of alignment block assemblies 12 that helps to ensure proper alignment of the plates 8 prior to welding. One of the alignment block assemblies 12 is positioned along a third edge 18 of the profile 6 and helps with alignment of the plates 8 by causing their movement in the direction of the first axis (X). The second alignment block assembly is positioned along a fourth edge 20 of the profile 6 and helps with alignment of the plates 8 by causing their movement in the direction of the second axis (Y).

Figure 9:
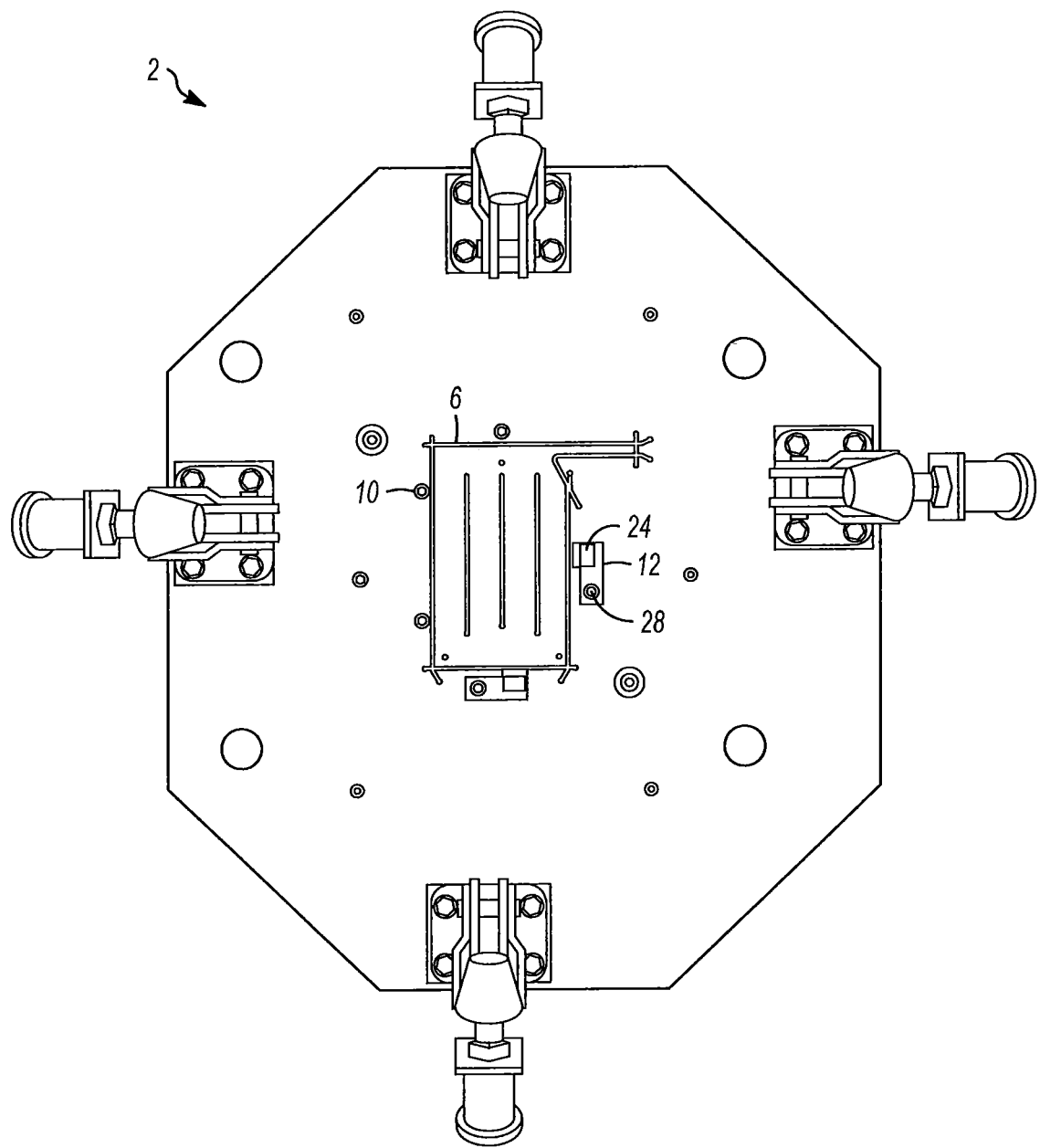
FIG. 9 shows a plan view of a bottom fixture assembly in accordance with a third embodiment of the disclosure.
Figure 10:
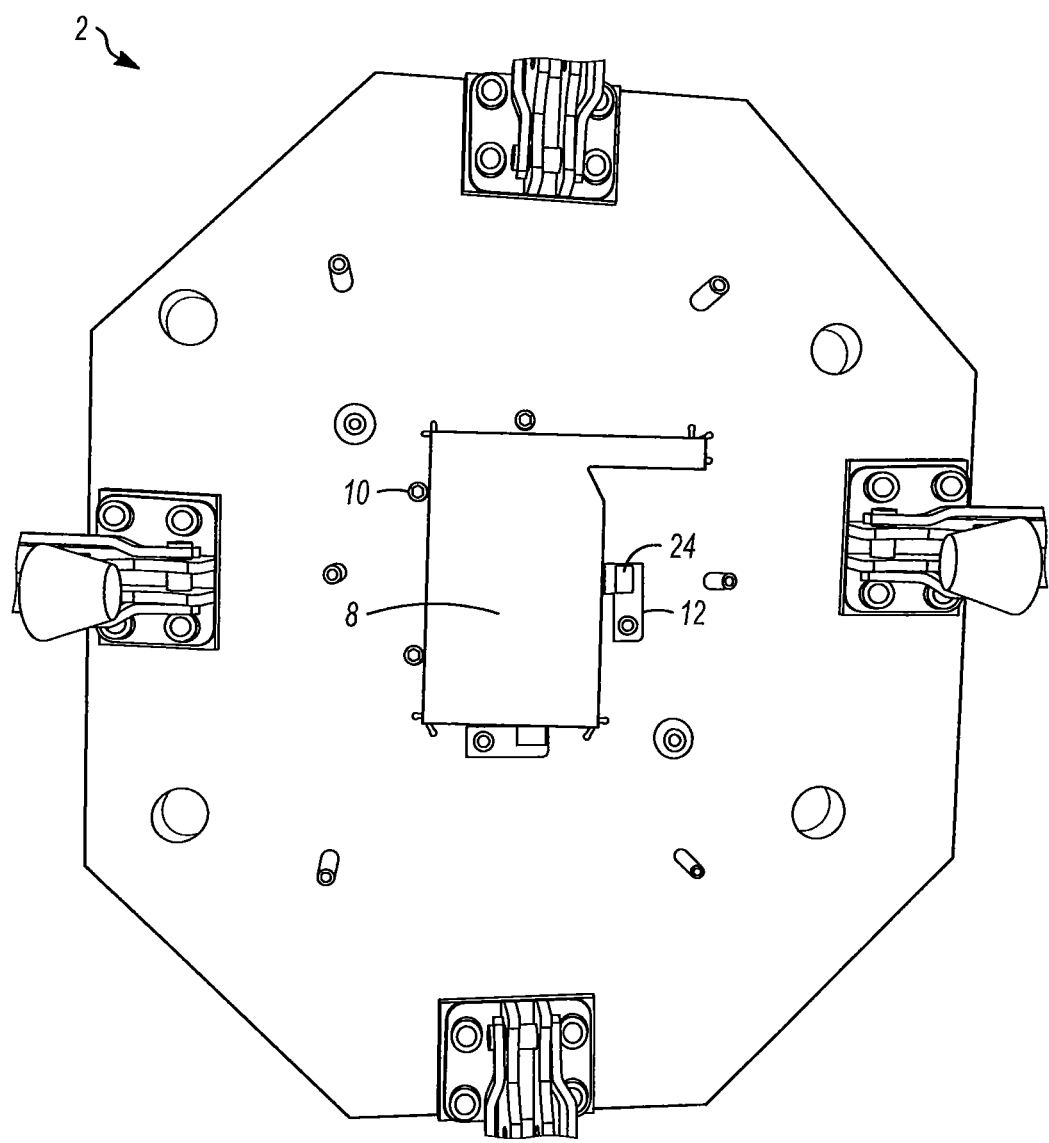
FIG. 10 shows a plan view of a bottom fixture assembly prior to alignment of the plates in accordance with a third embodiment of the disclosure.
Figure 11:
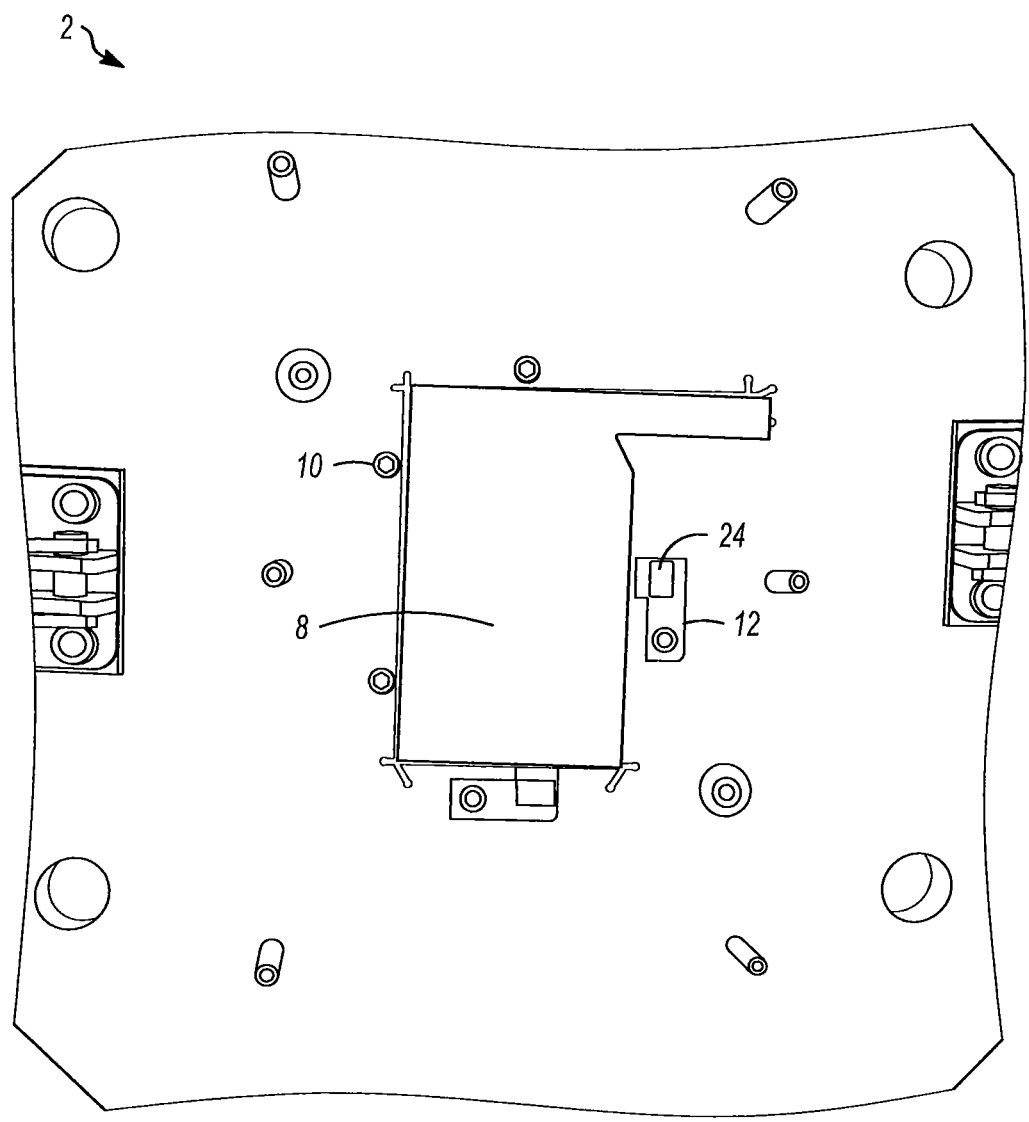
FIG. 11 shows a plan view of a bottom fixture assembly after alignment of plates in accordance with a third embodiment of the disclosure.

The position of the alignment block assemblies 12 on the bottom welding fixture 2 is not particularly limited and can be varied depending upon design and application requirements. In the embodiment shown in FIG. 1, the alignment block assemblies 12 are positioned to be opposite to the fixed locating pins 10 that prevent movements of the plates 8. However, as shown in FIGS. 9-11, the alignment block assembly 12 can be off-set and not opposite from the fixed locating pins 10, so long as the fixed locating pins 10 and the alignment block assembly 12 work in sync to ensure proper alignment of the plates 8 prior to welding. As described herein, the alignment block assembly 12 pushes the plates 8 against the pins 10, with at least one alignment block assembly 12 pushing against the plates 8 in the first (X) axis and another alignment block assembly 12 pushing against the plates 8 in the second (Y) axis. For purposes of alignment, one or more alignment block assembly 12 can be used to push the plates in the first (X) axis and/or the second (Y) axis.

As an exemplary embodiment, the connection and structure of the alignment block assembly 12 to the bottom welding fixture 2 will be described with reference to FIGS. 2 and 3.

Figure 2:
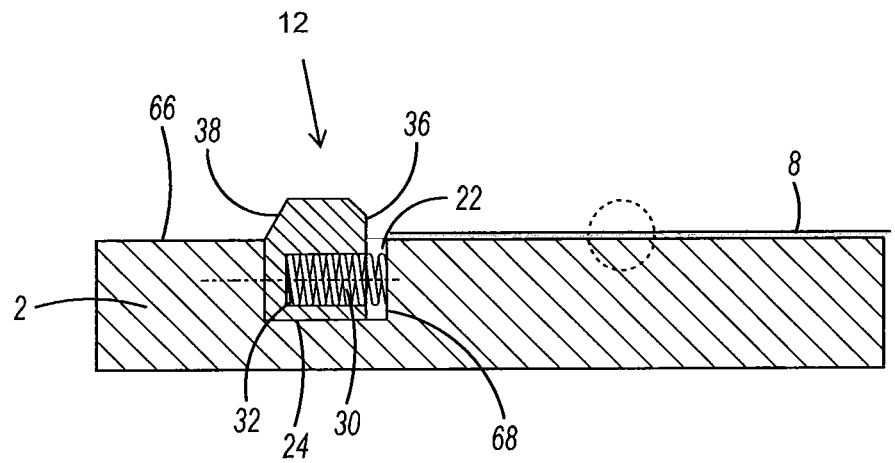
FIG. 2 shows a side cross-sectional view of the lower fixture assembly of the welding device in accordance with a first embodiment of the disclosure.

In one embodiment, as shown in FIG. 2, the alignment block assembly 12 is positioned within a bottom welding fixture cavity 22 in the bottom welding fixture 2. The alignment block assembly 12 has an L-shaped alignment block 24 (FIG. 3), a block holder 26, a screw 28 and a block spring 30 positioned in a chamber 32 (FIG. 2) of the L-shaped alignment block 24. The size of the bottom welding fixture cavity 22 permits lateral movement of the L-shaped alignment block (24), in the plane of the bottom welding fixture 2. The block holder 26 is mounted to the bottom welding fixture 2 by the screw 28, and engages the lip 34 of the L-shaped alignment block 24 to limit movement of the L-shaped alignment 24 out of the plane of the page (in an axis perpendicular to both the X and Y axes).

As shown in FIG. 2, the L-shaped alignment block 24 has a chamber 32 having a block spring 30 positioned therein. The L-shaped block 24 has a plate contacting face 36 that engages the plate or plate pair 8 to assist with alignment of the plates 8 prior to welding. In addition, the L-shaped block 24 has a tapered or rounded surface 38 opposed to the plate contacting face 36. During resting stage, when the top welding fixture 4 is not engaged or prior to alignment of the plates 8, the block spring 30 biases the L-shaped block 24 towards a first position of the L-shaped block 24 in the bottom welding fixture cavity 22 of the bottom welding fixture 2. In the first position of the L-shaped block 24, the plate contacting face 36 of the L-shaped block 24 is positioned away from the edge of the profile 6 or plates 8, making it easier for the plates 8 to be positioned on or removed from between the alignment blocks assemblies 12 and locating pins 10 on the bottom welding fixture 2.

As further described herein, when the top welding fixture 4 is positioned on the bottom welding fixture 2 for welding the plates 8, the L-shaped block 24 moves towards the second position (FIG. 6) of the L-shaped block 24 in the bottom welding fixture cavity 22 of the bottom welding fixture 2. In the second position, the block spring 30 is compressed with the plate contacting face 36 of the L-shaped block 24 being close to and aligned with the edge of the profile 6, leading to alignment of the plates 8 prior to and during welding.

Figure 4:
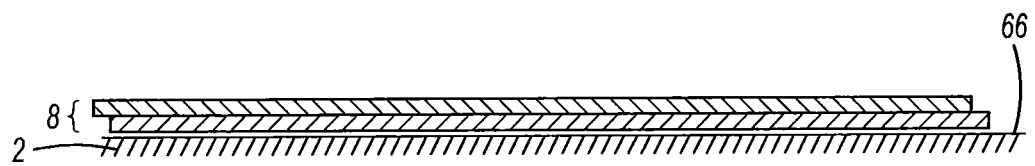
FIG. 4 shows an enlarged view of the encircled portion in FIG. 2.

FIG. 4 shows an expanded view of the encircled portion of FIG. 2, showing the plate pair 8 positioned on the bottom welding fixture 2 prior to alignment and welding.

In one embodiment, the top welding fixture 4 used with the bottom welding fixture 2 shown in FIG. 2, has two wedge pusher assemblies 40 that are positioned in the top welding fixture 2 to align with the alignment block assemblies 12 on the bottom welding fixture 2, when the top welding fixture 4 and bottom welding fixture 4 are brought together to form the welding device 1. The wedge pusher assemblies 40 functioning as actuators 78 to actuate movement of the alignment block assembly 12. The number of weld pusher assemblies 40 can vary and depend upon the number of alignment block assemblies 12. The number of weld pusher assemblies 40 being equal to the number of alignment block assemblies 12, with each weld pusher assembly being positioned to engage with an alignment block assembly 12.

Each wedge pusher assembly 40 has a wedge pusher 42, a wedge pusher assembly spring 44, one spring cover 46 and a set of screws 48. In the embodiment shown, two screws 48 are used to mount the spring cover 46 to the top surface 50 of the top welding fixture 4. The wedge pusher assembly spring 44 engages the spring cover 46 at one end and wedge pusher 42 at an opposing end.

In the embodiment shown in FIG. 5, the wedge pusher assembly 40 is positioned in an aperture 52 of the top welding fixture 4. In the embodiment shown, the wedge pusher 42 has a generally T-shaped profile with the top end 54 of the wedge pusher 42 engaging a step 56 formed in the wall of the top welding fixture 4 defining the aperture 52, to ensure proper positioning of the wedge pusher in the aperture 52. The wedge pusher assembly spring 44 is positioned to engage the top end 54 of the wedge pusher 42 to limit movement of the wedge pusher 42 and bias the wedge pusher to a position where the top end 54 of the wedge pusher 42 is engaged with the step 56 formed in the wall of the top welding fixture 4 defining the aperture 52. The bottom end 58 of the wedge pusher 42 has a generally flat surface, which in one embodiment, for example and without limitation, can be flush or aligned with the bottom surface 60 of the top welding fixture 4. The bottom end 58 of the wedge pusher is also provided with a tapered surface 62 that engages and actuates the L-shaped alignment block 24 to move from the first position to the second position of the L-shaped alignment block 24.

Figure 6:
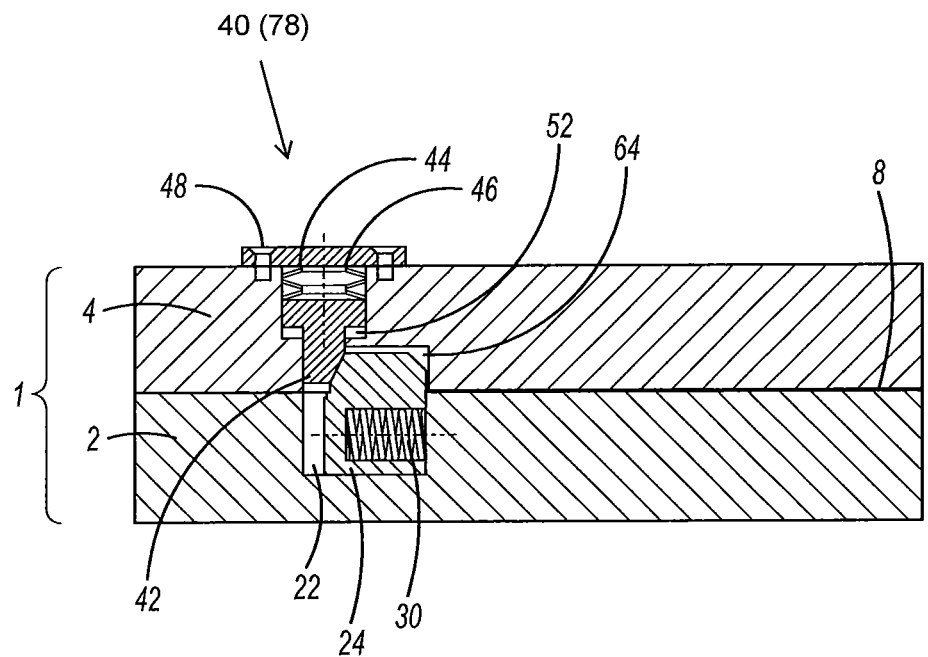
FIG. 6 shows cross-sectional view of the welding device in accordance with a first embodiment of the disclosure.

The bottom surface 60 of the top welding fixture 4 has a cut-out 64 formed to receive the L-shaped alignment block 24 that extends above the top surface 66 of the bottom welding fixture 2, and permits movement of the L-shaped alignment block 24 from the first position to the second position to engage and align the plates 8, when the top welding fixture 4 is placed on the bottom welding fixture 2, to form the welding device 1. When the top welding fixture 4 is placed on the bottom welding fixture 2, the wedge pusher 42 in the top welding fixture 4 contacts the L-shaped alignment block 24 in the bottom welding fixture 2 and pushes the L-shaped alignment block 24, moving it towards the second position, to align the parts (plates 8 to be welded) before the top and bottom welding fixtures 4, 2 are fully closed. The L-shaped alignment block 24 stops moving when it touches the side wall 68 of the bottom welding fixture 2. The top welding fixture 4 is moved down till it fully closes, which can result in the wedge pusher 42 being pushed upwards to compress the wedge pusher assembly spring 44, as shown in FIG. 6.

Figure 7:
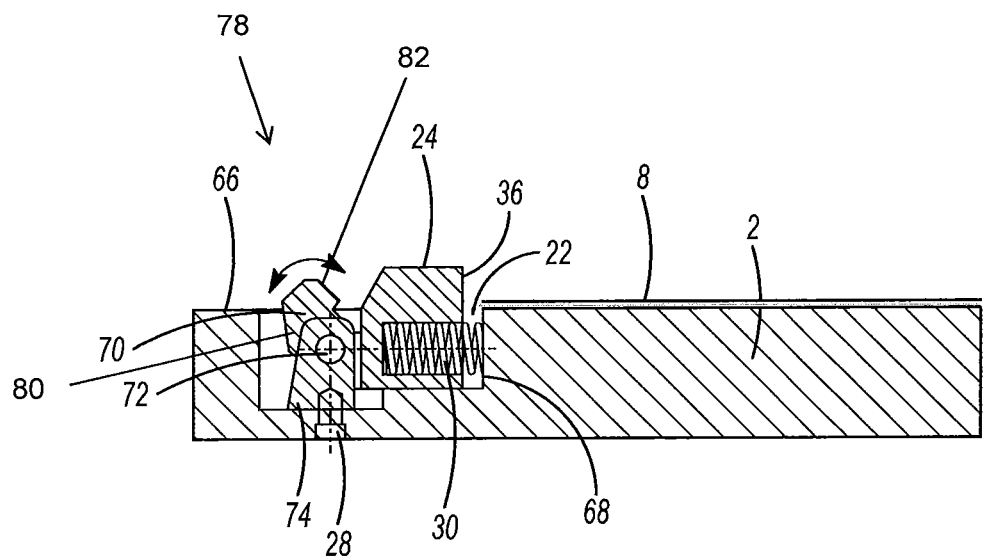
FIG. 7 shows a side cross-sectional view of the bottom fixture assembly of the welding device in accordance with a second embodiment of the disclosure.
Figure 8:
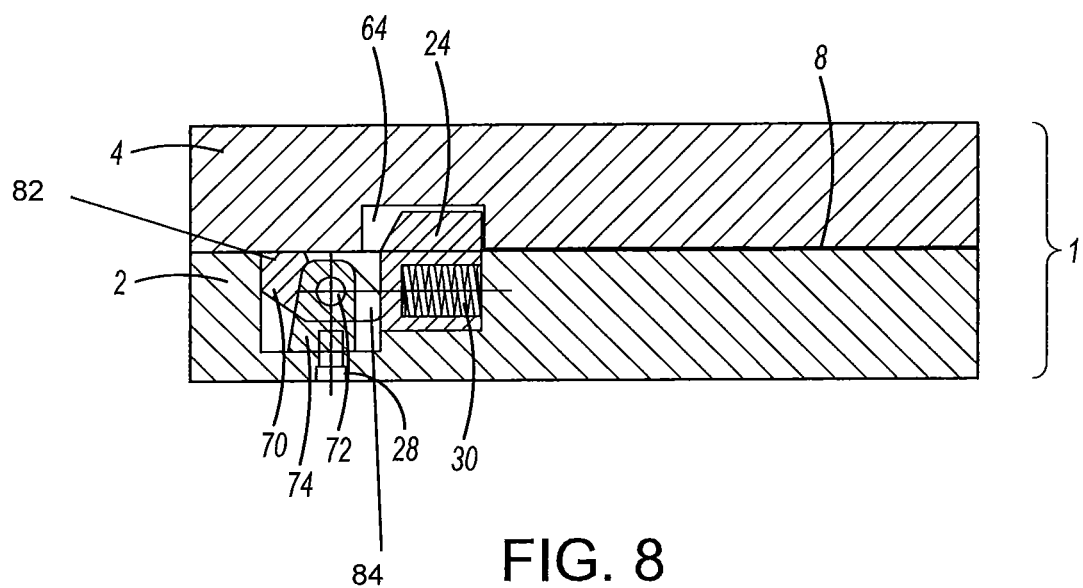
FIG. 8 shows cross-sectional view of the welding device in accordance with a second embodiment of the disclosure.

FIGS. 7 and 8 relate to a second embodiment of a welding device 1 disclosed herein. The second embodiment of the welding device 1 is similar to the first embodiment disclosed in FIGS. 1-6, with the differences being disclosed herein.

The bottom welding fixture 2 can have a profile 6 similar to the profile shown in FIG. 1, and is provided with fixed locating pins 10 and a pair of alignment block assemblies 12. As noted above, providing a profile 6 is not necessary and bottom welding fixtures 2 without a profile 6 can also be used. The cavity 22 formed in the bottom welding fixture 2 has a larger volume in the second embodiment than the cavity 22 formed in the bottom welding fixture 2 of the first embodiment. Although the cavity 22 shown in FIG. 7 has two sections, with one section having the alignment block assembly 12 and another deeper section having an actuator 78 to actuate the alignment block 24, the depth of the cavity 22 can be varied depending upon design and application requirements. The alignment block assembly 12 in the second embodiment has the actuator 78 located in the bottom welding fixture 2, rather than the top welding fixture 4 as in the first embodiment. In addition, due to the position of the actuator 78 in the bottom welding fixture 2, the structure of the actuator 78 is different from the structure of the actuator 78 in the first embodiment; however, in both embodiments, the actuator 78 actuates the movement of the alignment block assembly 12 upon closure of the top welding fixture 4 on the bottom welding fixture 2.

Figure 3:
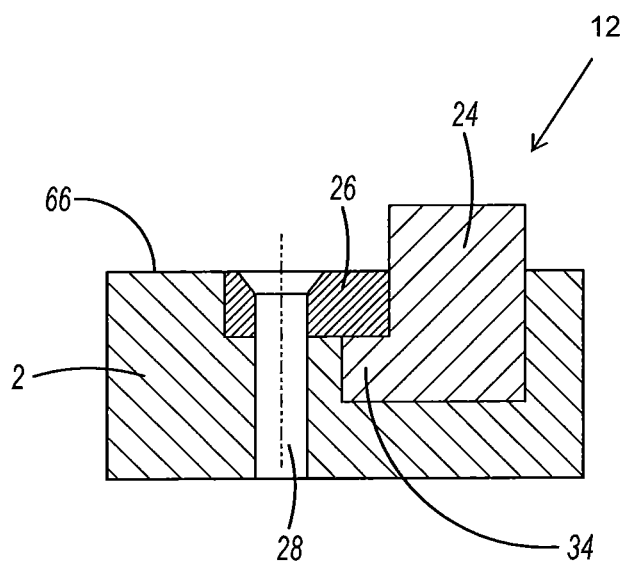
FIG. 3 shows a cross-sectional view of the alignment block assembly in the lower fixture assembly of the welding device in accordance with a first embodiment of the disclosure, with the cross-section being from a different direction than that shown in FIG. 2.

The alignment block assembly 12 of the second embodiment has a L-shaped alignment block 24, a block spring 30 and a block holder 26, with the L-shaped alignment block moveable from a first position to a second position, similar to the alignment block assembly 12 of the first embodiment, described with respect to FIGS. 2 and 3.

To actuate the alignment block assembly 12, the alignment block assembly 12 of the second embodiment has an actuator 78 provided with a tilt block 70, an axis pin 72, an anchor block 74 and one or more screws 28 to affix the anchor block 74 in the cavity 22 of the bottom welding fixture 2. In the embodiment shown in FIG. 7, the actuator 78 is present in the deeper section of the cavity 22. The axis pin 72 is coupled to the anchor block 74 and the tilt block 70, permitting the tilt block 70 to pivot about the axis of the pin 72.

The structure of the tilt block 70 provided is not particularly limited. The tilt block 70 has a central body portion 80 that has an orifice (not shown) for receiving the axis pin 72 to pass through and hold the tilt block 70 in place. The tilt block 70 is also provided with a tilt block top weld plate contact surface 82 that extends above the top surface 66 of the bottom welding fixture 2. When the top welding fixture 4 is brought in contact with the bottom welding fixture 2, the top welding fixture 4 also contacts the tilt block top weld plate contact surface 82 causing the tilt block 70 to pivot about the axis pin 72. Upon closure (FIG. 8) of the top welding fixture 4 on the bottom welding fixture 2, the tilt block top weld plate contact surface 82 lies in a plane parallel to the plane of the bottom surface 60 of the top welding fixture 4. In addition, the tilt block top weld plate contact surface 82 is structured to be positioned in the cavity 22 when the top welding fixture 4 is positioned on the bottom welding fixture 2.

The tilt block 70 is also provided with a tilt block alignment block contact surface 84 that is opposed to the tilt block top weld plate contact surface 82, with the tilt block body 80 being in between tilt block top weld plate contact surface 82 and the tilt block alignment block contact surface 84. The structure and shape of the tilt block alignment block contact surface 84 is not particularly limited and can be varied, depending upon the design and application requirements. Further, when the tilt block 70 pivots about the axis pin 72, the tilt block alignment block contact surface 84 moves from a retracted position where the alignment block 24 is in the first position and is spaced from the plates 8, to an engaged position where the alignment block 24 is in the second position causing the plates 8 to align.

The overall structure of the tilt block 70 is not particularly limited and can be varied depending upon design and application requirements. In the embodiment shown, the tilt block 70 has an arcuate profile, with one end (tilt block top weld plate contact surface 82) that extends above the top surface 66 of the bottom welding fixture 2, and when the top welding fixture 4 is brought into contact with the bottom welding fixture 2, the actuator 78 actuates movement of the L-shaped alignment block 24 to move from a first position to the second position, with the second end (tilt block alignment block contact surface 84) engaging the alignment block 24, when the top welding fixture 4 is brought in contact with the bottom welding fixture 2. When the top welding fixture 4 is moved away, the block spring 30 pushes the L-shaped alignment block 24 to the first position away from the profile 6 or plates 8 to provide space for ease in loading/unloading of the plates 8 to be welded.

As shown in FIG. 8, the top welding fixture 4 has a cut-out 64 in the bottom surface 60, which is positioned to receive the L-shaped alignment block 24 and permit its movement from the first position to the second position. Unlike the first embodiment shown in FIGS. 5 and 6, the top welding fixture 4 of the second embodiment lacks wedge pusher assembly. Rather, when the top welding fixture 4 is placed onto the bottom welding fixture 2, the bottom surface 60 of the top welding fixture 4 contacts the tilt block 70 in the alignment block assembly 12, causing the tilt block 70 to rotate about the axis pin 72, resulting in pushing the L-shaped alignment block 24 towards the second position to align the plates 8 for welding.

FIGS. 9-13 show plan views of a third embodiment of the welding device 1 in accordance with the disclosure herein. FIG. 9 shown the bottom welding fixture 2 before the plates 8 are positioned on the bottom welding fixture 2. Once the plates 8 are positioned 8 on the bottom welding fixture 2, they can be offset or misaligned as shown in FIG. 11. The top welding fixture 4 is then positioned on the bottom welding fixture 2 to weld the plates 8 as described herein. After welding, the top welding fixture 4 is removed to obtain aligned and welded plates 8 as shown in FIG. 10.

Figure 12:
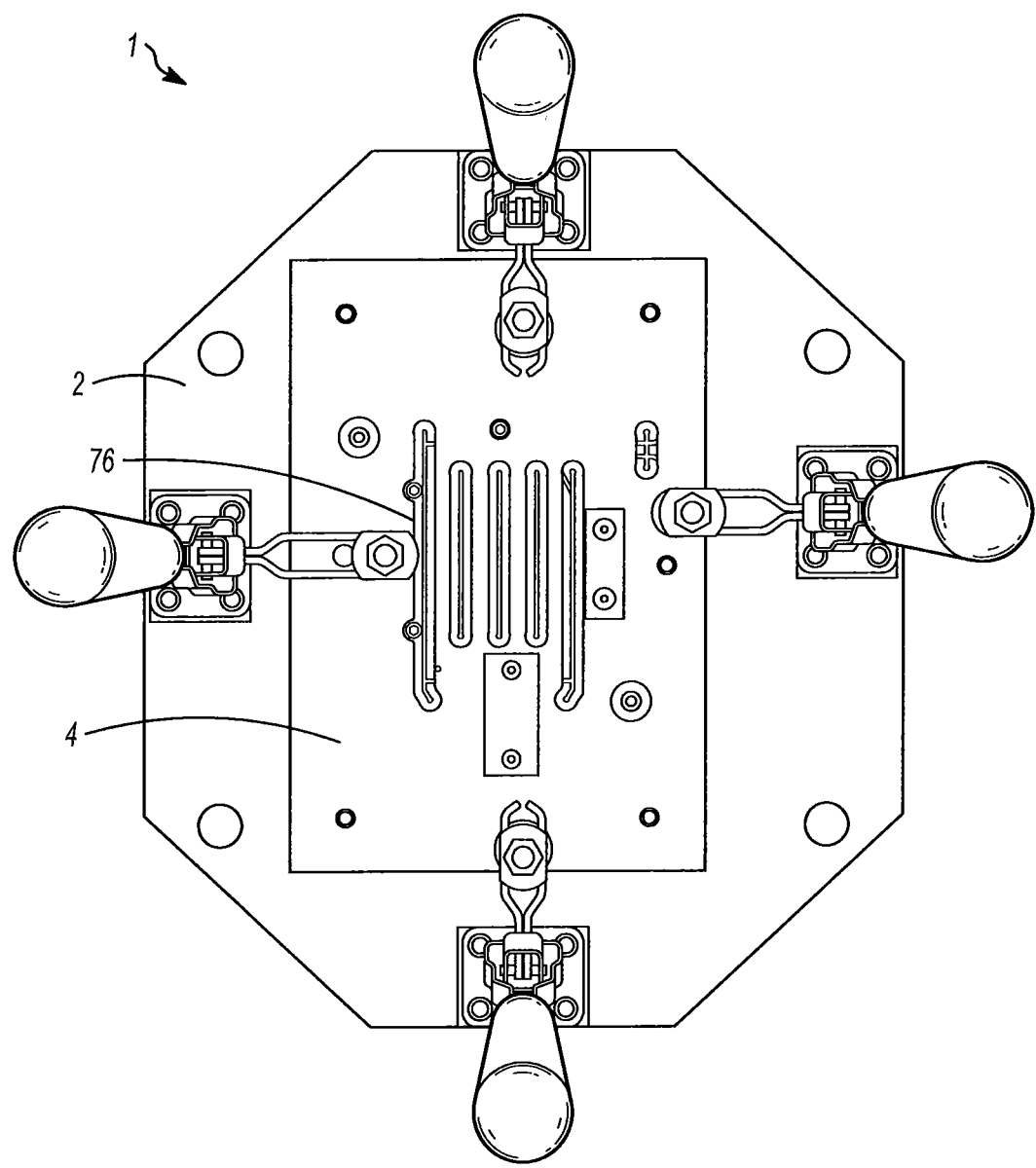
FIG. 12 shows a plan view of a top fixture assembly in accordance with a third embodiment of the disclosure.
Figure 13:
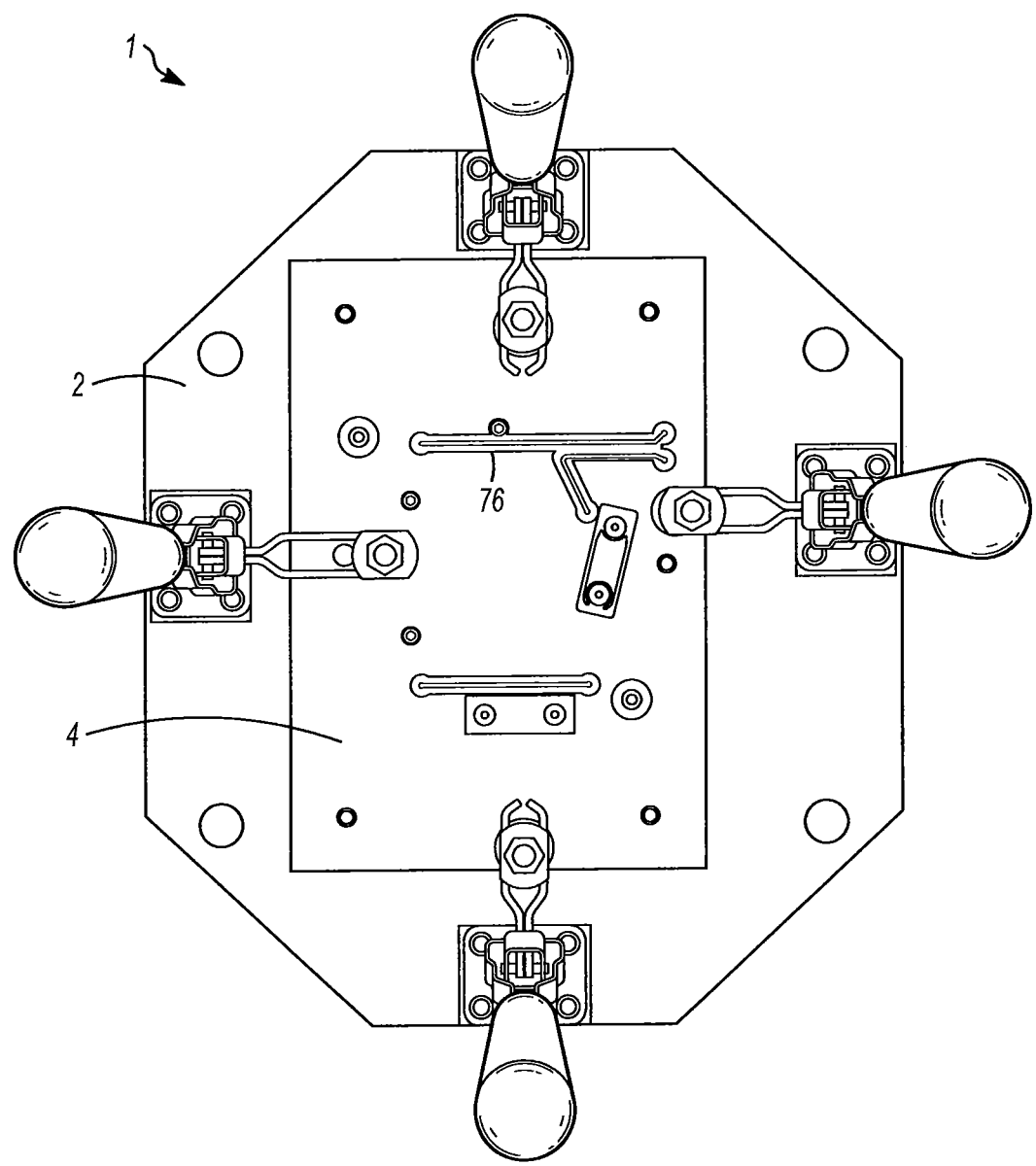
FIG. 13 shows a plan view of a second top fixture assembly in accordance with a third embodiment of the disclosure.

FIGS. 12 and 13 show two different types of top welding fixtures 4 having slits 76 in top welding fixture 4. The outermost slits 76 show the outer edges of the plates 8 to be welded and provide an opening for laser welding of the plates 8.

When welding the plates 8, initially, the top welding fixture 4 shown in FIG. 12 is placed on the bottom welding fixture 2 to align the plates 8. In the embodiment shown in FIG. 12, the slits 76 extend in the second (Y) axis, while in the embodiment shown in FIG. 13, the slits 76 extend in the first (X) axis. Once positioned and closed, the plates 8 can be welded using the opening provided by the slits 76. For instance, after positioning the top welding fixture 4 shown in FIG. 12, the edge of the plates 8 that extend along the second (Y) axis are welded. The top welding fixture 4 is removed and replaced with the top welding fixture 4 shown in FIG. 13, which is similarly used to weld the edges of the plates 8 that extend along the first (X) axis. In another further, embodiment, the top welding fixture 4 can be provided with slits 76 that extend in both the first and second axis.

Certain adaptations and modifications of the described embodiments can be made. Therefore, the above discussed embodiments are considered to be illustrative and not restrictive.

PARTS LIST

| No. | Description |
| --- | --- |
| 1 | Welding device |
| 2 | Bottom welding fixture |
| 4 | Top welding fixture |
| 6 | Profile on bottom welding fixture |

-continued

PARTS LIST

| No. | Description |
| --- | --- |
| 8 | Plate pair |
| 10 | Fixed locating pins |
| 12 | alignment block assemblies |
| 14 | first edge of the profile |
| 16 | second edge of the profile |
| 18 | third edge of the profile |
| 20 | forth edge of the profile |
| 22 | Cavity in bottom welding fixture |
| 24 | L-shaped alignment block |
| 26 | Block holder |
| 28 | Screw |
| 30 | Block spring |
| 32 | Chamber |
| 34 | Lip of L-shaped alignment block |
| 36 | plate contacting face of 24 |
| 38 | tapered or rounded surface |
| 40 | wedge pusher assemblies |
| 42 | wedge pusher |
| 44 | Wedge pusher assembly spring |
| 46 | Spring cover |
| 48 | Screws of wedge pusher assembly |
| 50 | Top surface of 4 |
| 52 | Aperture of 4 |
| 54 | Top end of wedge pusher |
| 56 | Step formed in 52 |
| 58 | Bottom end of wedge pusher |
| 60 | Bottom surface of 4 |
| 62 | Tapered surface of wedge pusher |
| 64 | Cut-out in bottom surface of 4 |
| 66 | Top surface of 2 |
| 68 | Side wall of 2 |
| 70 | Tilt block |
| 72 | an axis pin |
| 74 | an anchor block |
| 76 | Slits in top welding fixture |
| 78 | Actuator |
| 80 | Body potion |
| 82 | Tilt block top weld plate contact surface |
| 84 | Tilt block alignment block contact surface |

What is claimed is:

1. A device for alignment of parts for welding, the device comprising:
a bottom welding fixture and a top welding fixture, the top welding fixture moveable from an engaged position having the top welding fixture engage the bottom welding fixture, to a disengaged position having the top welding fixture spaced from the bottom welding fixture;
the bottom welding fixture having:
a profile providing an outline of a position of the parts to be welded;
a plurality of fixed locating pins positioned along a peripheral edge of the profile limiting movement of the part to be welded in a first axis and a second axis, the first axis being perpendicular to the second axis; and
at least a pair of alignment block assemblies positioned along the peripheral edge of the profile to actuate movement of the part to be welded in the first axis and the second axis; each of the alignment block assemblies having an alignment block moveable from a first position having the alignment block spaced from the peripheral edge of the profile to a second position having the alignment block proximate to the profile; and
an actuator coupled to the top welding fixture or the bottom welding fixture to actuate movement of the alignment block from the first position to the second position upon engagement of the top welding fixture to the bottom welding fixture.

2. The device of claim 1, wherein the bottom welding fixture has a cavity for receiving the alignment block assembly.

3. The device of claim 1, wherein the alignment block is a L-shaped alignment block having a chamber with a block spring in the chamber; and
wherein each of the alignment block assemblies comprises:
a block holder engaging a lip of the L-shaped alignment block, the block holder retaining the L-shaped alignment block in a cavity of the bottom welding fixture; and
a fastener for fastening the block holder to the bottom welding fixture, and
wherein a portion of the L-shaped alignment block protrudes above a top surface of the bottom welding fixture.

4. The device of claim 3, wherein the portion of the L-shaped alignment block that protrudes above the top surface of the bottom welding fixture has a plate contacting face and an opposed tapered or rounded surface.

5. The device of claim 3, wherein the top welding fixture has a cut-out on a bottom surface of the top welding fixture, the cut-out being formed to receive the portion of the L-shaped alignment block that protrudes above the top surface of the bottom welding fixture, and permit movement of the L-shaped alignment block from the first position to the second position.

6. The device of claim 1, wherein the actuator is coupled to the top welding fixture.

7. The device of claim 6, wherein the actuator is a wedge pusher assembly positioned in an aperture in the top welding fixture, the top welding fixture having the aperture proximate to the cut-out in the top welding fixture.

8. The device of claim 7, wherein the wedge pusher assembly comprises:
a T-shaped wedge pusher having a top end of the T-shaped wedge pusher engaging a step in a wall of the top welding fixture defining the aperture;
a spring cover affixed to a top surface of the top welding fixture; and
a wedge pusher assembly spring sandwiched between the T-shaped wedge pusher and the spring cover, the wedge pusher assembly spring biasing the top end of the T-shaped wedge pusher to contact the step,
wherein when the top welding fixture engages the bottom welding fixture, the bottom end of the T-shaped wedge pusher contacts the L-shaped alignment block for actuating movement of the L-shaped alignment block in a cavity of the bottom welding fixture from the first position to the second position of the L-shaped alignment block.

9. The device of claim 8, wherein the bottom end of the T-shaped wedge pusher has a tapered surface, the tapered surface of the wedge pusher contacting the tapered or rounded surface on the L-shaped alignment block when the top welding fixture engages the bottom welding fixture.

10. The device of claim 1, wherein the actuator is coupled to the bottom welding fixture and positioned in a cavity of the bottom welding fixture.

11. The device of claim 10, wherein the actuator comprises:
an anchor block affixed to the bottom welding fixture;
an axis pin coupled to the anchor block; and
a tilt block coupled to the axis pin and rotatable about the axis pin to actuate movement of the L-shaped alignment block from the first position to the second position when the top welding fixture contacts the bottom welding fixture.

12. The device of claim 11, wherein the tilt block comprises:
a protrusion extending above a plane of the top surface of the bottom welding fixture towards the top welding fixture, with the L-shaped alignment block in the first position; and
a tongue moveable from a rest position to an actuated position to actuate movement of the L-shaped block to the second position upon rotation of the tilt block;
wherein the bottom surface of the top welding fixture contacts the protrusion on the block actuating rotation of the tilt block and movement of the tongue from the rest position to the actuated position, the protrusion being flush with the top surface of the bottom welding fixture upon engagement of the top welding fixture with the bottom welding fixture.

13. The device of claim 1, wherein the top welding fixture comprises one or more slits along one or more peripheral edges of the parts permitting welding of the parts.

14. A method of welding parts using a device having a bottom welding fixture and a top welding fixture, the bottom welding fixture having a plurality of fixed locating pins for positioning of parts to be welded and limiting movement of the parts in a first axis and a perpendicular second axis, and at least pair of alignment block assemblies to actuate movement of the parts to be welded in the first axis and the second axis, the alignment block assembly having an alignment block moveable from a first position to a second position for contacting and aligning the parts, and an actuator coupled to the top welding or bottom welding fixture to actuate movement of the alignment block from the first position to the second position upon engagement of the top welding fixture to the bottom welding fixture, and the top welding fixture having slits along edges of the parts to be welded, the method comprising:
positioning the parts to be welded on the bottom welding fixture;
positioning the top welding fixture on the bottom welding fixture;
actuating the alignment block to move from the first position to the second position for aligning of the parts to be welded; and
welding the parts via the slits to weld the parts.

15. The method of claim 14, wherein the welding is performed by laser welding.

* * * * *